(12) United States Patent
Iwamoto (10) Patent No.: US 11,495,817 B2
(45) Date of Patent: Nov. 8, 2022

(54) CELL, CELL STACK DEVICE, MODULE, AND MODULE HOUSING DEVICE

(71) Applicant: KYOCERA Corporation, Kyoto (JP)

(72) Inventor: Takayuki Iwamoto, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/293,857

(22) PCT Filed: Nov. 27, 2019

(86) PCT No.: PCT/JP2019/046376
§ 371 (c)(1),
(2) Date: May 13, 2021

(87) PCT Pub. No.: WO2020/111124
PCT Pub. Date: Jun. 4, 2020

(65) Prior Publication Data
US 2022/0013799 A1    Jan. 13, 2022

(30) Foreign Application Priority Data

Nov. 29, 2018   (JP) .............................. JP2018-223524

(51) Int. Cl.
| | | |
|---|---|---|
| *H01M 8/1213* | (2016.01) | |
| *H01M 8/2475* | (2016.01) | |
| *H01M 8/2484* | (2016.01) | |
| *H01M 8/2455* | (2016.01) | |
| *H01M 8/04746* | (2016.01) | |
| *H01M 8/12* | (2016.01) | |

(52) U.S. Cl.
CPC ..... *H01M 8/1213* (2013.01); *H01M 8/04746* (2013.01); *H01M 8/2455* (2013.01); *H01M 8/2475* (2013.01); *H01M 8/2484* (2016.02); *H01M 2008/1293* (2013.01); *H01M 2300/0065* (2013.01)

(58) Field of Classification Search
CPC ........... H01M 8/1213; H01M 8/04746; H01M 8/2455; H01M 8/2475; H01M 8/2484; H01M 2008/1293; H01M 2300/0065; H01M 8/126; H01M 2300/0074; H01M 2300/0094; H01M 8/2428; H01M 8/1246; Y02E 60/50

See application file for complete search history.

(56) References Cited

U.S. PATENT DOCUMENTS

| | | | | |
|---|---|---|---|---|
| 2004/0126488 A1* | 7/2004 | Lane | .................... | H01M 8/126 427/226 |
| 2007/0015033 A1 | 1/2007 | Kushibiki et al. | | |
| 2010/0167154 A1 | 7/2010 | Ono | | |
| 2010/0266925 A1 | 10/2010 | Hori | | |
| 2012/0189939 A1* | 7/2012 | Fujimoto | ............ | H01M 8/1253 429/465 |
| 2018/0212251 A1* | 7/2018 | Imanaka | ............ | H01M 8/2485 |

FOREIGN PATENT DOCUMENTS

| | | |
|---|---|---|
| CN | 1822422 A | 8/2006 |
| CN | 101507028 A | 8/2009 |
| EP | 3561928 A1 | 10/2019 |
| JP | H9-92302 A | 4/1997 |
| JP | 2006-512737 A | 4/2006 |
| JP | 2006-344543 A | 12/2006 |
| JP | 2007-59377 A | 3/2007 |
| JP | 2008-226653 A | 9/2008 |
| JP | 2014-26926 A | 2/2014 |
| JP | 2017-103244 A | 6/2017 |
| WO | 2018/117098 A1 | 6/2018 |

OTHER PUBLICATIONS

Decision to Grant a Patent for the corresponding JP Application No. 2020-526169, dated Jul. 2, 2020, 5 pages.
Written Opposition to the Grant of a Patent for the corresponding JP Patent No. 6749064 (App No. 2020-526169) dated Dec. 7, 2020, 65 pages.
Ouestioning of the Patent Formal Objection No. 2020-700960 for the corresponding JP Patent No. 6749064 (App No. 2020-526169) dated May 27, 2021, 6 pages.
Written Reply of the Patent Formal Objection No. 2020-700960 for the corresponding JP Patent No. 6749064 (App No. 2020-526169) dated Jul. 16, 2021, 5 pages.
Decision on Opposition of the Patent Formal Objection No. 2020-700960 for the corresponding JP Patent No. 6749064 (App No. 2020-526169) dated Aug. 30, 2021, 77 pages.
International Search Report and Written Opinion for the corresponding PCT Application No. PCT/JP2019/046376 dated Feb. 25, 2020, 6 pages.
J. A. Lane et al., Mitigation of the deleterious effect of silicone species on the conductivity of ceria electrolytes, Feb. 22, 2006, Solid State Ionics 177 (2006), p. 1911-1915, www.sciencedirect.com, 6 pages.

* cited by examiner

*Primary Examiner* — Muhammad S Siddiquee
(74) *Attorney, Agent, or Firm* — Procopio Cory Hargreaves and Savitch LLP (57) ABSTRACT

A cell according to the present disclosure includes: a solid electrolyte layer including a first surface and a second surface opposite to the first surface; a fuel electrode on the first surface; an air electrode on the second surface; and a middle layer between the second surface and the air electrode. The middle layer=is a $CeO_2$-type sintered body containing Si, the content of Si equivalent to or less than 150 ppm in terms of $SiO_2$. A cell stack device includes a cell stack in which the plurality of cells is aligned. A module includes: a storage container; and the cell stack device that is housed in the storage container. A module housing device includes: an external case; the module and an auxiliary equipment that drives the module, which are housed in the external case.

8 Claims, 6 Drawing Sheets

CELL, CELL STACK DEVICE, MODULE, AND MODULE HOUSING DEVICE

FIELD

The present disclosure relates to a cell, a cell stack device, a module, and a module housing device.

BACKGROUND

Recently, as the next generation energy, there has been proposed a fuel battery. The fuel battery is capable of generating electric power by using fuel gas, such as gas containing hydrogen, and gas containing oxygen such as air. For example, Patent Literature 1 discloses a fuel battery module obtained by housing, in its case, a plurality of fuel battery cells.

CITATION LIST

Patent Literature

Patent Literature 1: Japanese Patent Application Laid-open No. 2007-059377

SUMMARY

Solution to Problem

A cell according to the present disclosure includes: a solid electrolyte layer including a first surface and a second surface opposite to the first surface; a fuel electrode on the first surface; an air electrode on the second surface; and a middle layer between the second surface and the air electrode, wherein the middle layer is a $CeO_2$-type sintered body containing Si, the content of Si equivalent to or less than 150 ppm in terms of $SiO_2$.

A cell stack device according to the present disclosure includes a cell stack in which the plurality of cells is aligned.

A module according to the present disclosure includes: a storage container; and the cell stack device that is housed in the storage container.

A module housing device according to the present disclosure includes: an external case; the module and an auxiliary equipment that drives the module, which are housed in the external case.

DESCRIPTION OF EMBODIMENTS (Cell)

Figure 1:
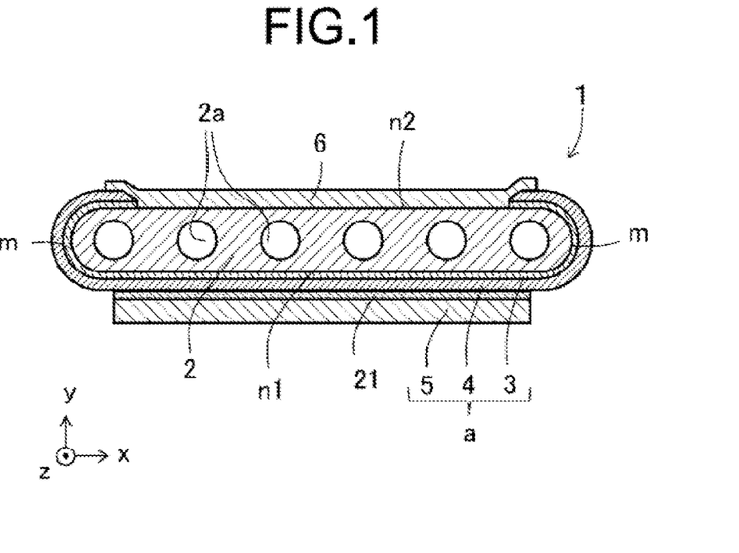
FIG. 1 is a lateral-cross-sectional view illustrating one example of a cell according to embodiments.
Figure 2:
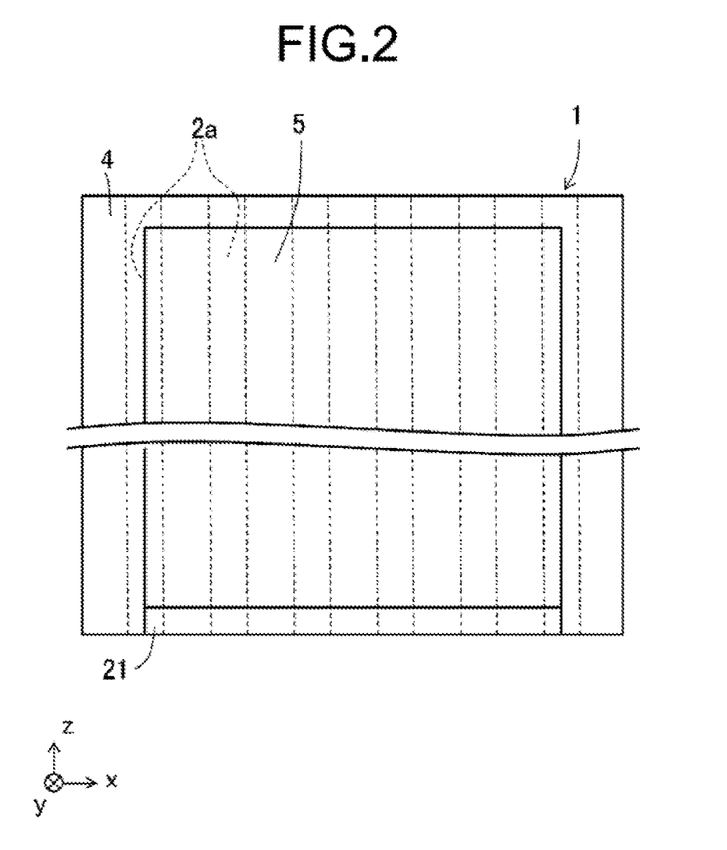
FIG. 2 is a plan view illustrating one example of the cell according to embodiments.
Figure 3:
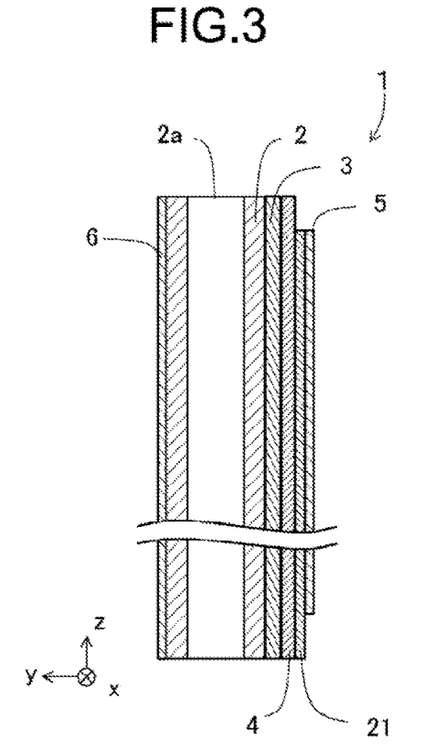
FIG. 3 is a longitudinal-cross-sectional view illustrating the cell illustrated in FIG. 1.

One example of a cell according to embodiments is illustrated in FIGS. 1 to 3. FIG. 1 is a lateral-cross-sectional view illustrating the cell, and FIG. 2 is a plan view illustrating the cell, which is viewed from bottom. FIG. 3 is a longitudinal-cross-sectional view illustrating the cell illustrated in FIG. 1. In FIGS. 1 to 3, a part of parts constituting a cell 1 is illustrated in an enlarged manner.

The cell 1 illustrated in FIGS. 1 to 3 is hollow plate-shaped, and its exterior is elongated plate-shaped. As illustrated in FIG. 2, the whole cell 1 in its plan view is rectangular-shaped having a side expanding in a length direction z, for example, and a side extending in a width direction x that is perpendicular to the length direction z, for example. For example, a length of the side extending in the length direction z may be 5 cm to 50 cm, and a length of the side extending in the width direction x may be 1 cm to 10 cm. A thickness of the whole cell 1 in a thickness direction y thereof may be 1 mm to 5 mm.

The cell 1 illustrated in FIG. 1 includes a support substrate 2, a fuel electrode 3, a solid electrolyte layer 4, an air electrode 5, and an inter-connector 6. The support substrate 2 is tubular-shaped, for example, hollow-plate-shaped and the like. The support substrate 2 illustrated in FIG. 1 includes a pair of a first flat surface n1 and a second flat surface n2 opposed to the first flat surface n1. In the support substrate 2, the fuel electrode 3 is arranged on the first flat surface n1, the solid electrolyte layer 4 is arranged on the fuel electrode 3, and the air electrode 5 is arranged on the solid electrolyte layer 4. In other words, the solid electrolyte layer 4 includes a first surface and a second surface opposed to the first surface, and the fuel electrode 3 is arranged on the first surface and the air electrode 5 is arranged on the second surface. A part of the solid electrolyte layer 4 interposed between the fuel electrode 3 and the air electrode 5 is referred to as an element part a. The inter-connector 6 is arranged on the second flat surface n2 of the support substrate 2.

Figure 4:
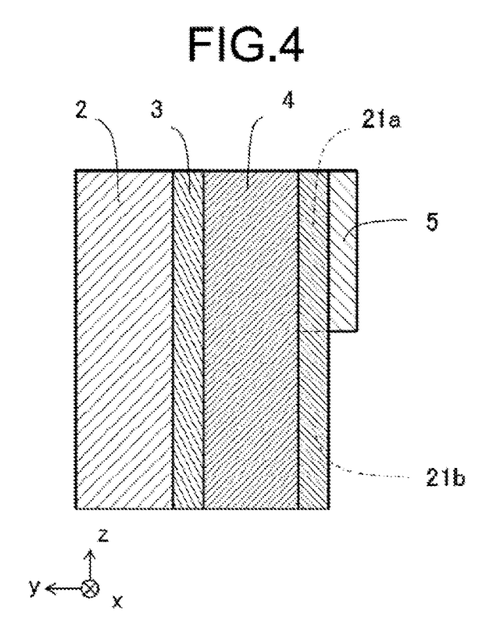
FIG. 4 is an enlarged cross-sectional view illustrating a part of FIG. 3.

As illustrated in FIGS. 2 and 3, a middle layer 21 is arranged between the solid electrolyte layer 4 and the air electrode 5. The middle layer 21 extends up to a first end part of the cell 1 in the length direction z. A part of the middle layer 21 positioned in the first end part of the cell 1 in the length direction z is not covered with the air electrode 5. As illustrated in FIG. 4, a part of the middle layer 21 between the solid electrolyte layer 4 and the air electrode 5 is defined as a first part 21a, and a part of the middle layer 21 arranged in the first end part of the cell 1 that is not covered with the air electrode 5 is defined as a second part 21b. Hereinafter, configuration elements constituting the cell 1 will be explained.

The solid electrolyte layer 4 is an electrolyte having an ion conductivity. Material of the solid electrolyte layer 4 may be $ZrO_2$ containing Ca, Mg, or a rare earth element, for example. Hereinafter, $ZrO_2$ containing Ca, Mg, or a rare earth element may be referred to as stabilized zirconia. Stabilized zirconia according to the present disclosure includes a partially-stabilized zirconia. A content of Ca, Mg, or a rare earth element contained in $ZrO_2$ may be, for example, equal to or more than 3 mol % and equal to or less than 15 mol % in terms of oxide. The Ca, Mg, or rare earth element is solid-dissolved in $ZrO_2$. The rare earth element contained in $ZrO_2$ may be, for example, Y, Nd, Sm, Gd, Yb, Sc, or the like. Respective oxides of these rare earth elements are $Y_2O_3$, $Nd_2O_3$, $Sm_2O_3$, $Gd_2O_3$, $Yb_2O_3$, and $Sc_2O_3$. Respective oxides of Ca and Mg are CaO and MgO. The cell 1 including the above-mentioned solid electrolyte layer 4 is, i.e. a solid-oxide cell. Note that another material may be employed for material of the solid electrolyte layer 4 as long as the material has an ion conductivity.

The solid electrolyte layer 4 is dense so as to hardly transmit gas therethrough. When the solid electrolyte layer 4 is dense, the solid electrolyte layer 4 hardly transmits fuel gas and gas containing oxygen therethrough, so that leakage hardly occurs. The solid electrolyte layer 4 may have a porosity of equal to or less than 15%, for example.

The fuel electrode 3 has electric conductivity so as to receive an electron emitted from an ion. A well-known material employed for a fuel electrode may be used as a material of the fuel electrode 3. The fuel electrode 3 may be made of an electric conductive ceramic, for example. A material of an electric conductive ceramic employed for the fuel electrode 3 may be one containing Ni and/or NiO having electric conductivity, and $ZrO_2$ containing a rare earth element, for example. A material of the $ZrO_2$ containing a rare earth element may be the same to that of the solid electrolyte layer 4.

The fuel electrode 3 may be porous, which has open pores. A surface area of the porous fuel electrode 3 is large to be able to increase a contact area with fuel gas. In the porous fuel electrode 3, reaction products of ion easily penetrate to the support substrate 2 through open pores. An open porosity of the fuel electrode 3 may be equal to or more than 10%, particularly equal to or more than 20% and equal to or less than 40%, for example.

The air electrode 5 has electric conductivity, and supplies an electron to oxygen so as to generate an oxide ion. A well-known material commonly employed for an air electrode may be employed for a material of the air electrode 5. The air electrode 5 may be made of an electric conductive ceramic, for example. A material of the electric conductive ceramic employed for the air electrode 5 may be a material having electric conductivity of, i.e. $ABO_3$-perovskite-type oxides, for example.

A composite oxide in which Sr and La are coexisting at A sites may be employed for the perovskite-type oxide having electric conductivity, for example. As an example of a composite oxide in which Sr and La are coexisting at A sites, $La_xSr_{1-x}Co_yFe_{1-y}O$, $La_xSr_{1-x}MnO_3$, $La_xSr_{1-x}FeO_3$, $La_xSr_{1-x}CoO_3$, and the like may be exemplified. Note that x satisfies 0<x<1, and y satisfies 0<y<1.

The air electrode 5 may be porous, which has open pores. A surface area of the porous air electrode 5 is large to be able to increase a contact area with gas containing oxygen. An open porosity of the air electrode 5 may be equal to or more than 20%, particularly equal to or more than 30% and equal to or less than 50%, for example.

The support substrate 2 includes therein gas flow paths 2a extending in the length direction z. For example, the support substrate 2 illustrated in FIG. 1 includes the six gas flow paths 2a.

The support substrate 2 has gas permeability and electric conductivity. The support substrate 2 has gas permeability, and thus fuel gas flowing through the gas flow paths 2a penetrates the support substrate 2 so as to reach the fuel electrode 3. The support substrate 2 has electric conductivity, and thus current collection is performed, via the inter-connector 6, on electric power generated by the element part a.

The support substrate 2 may be a ceramic that contains an inorganic oxide and an electric conductive material containing one of iron (Fe), cobalt (Co), and nickel (Ni), for example. The electric conductive material may be Ni and/or NiO, for example. The inorganic oxide may be a rare earth oxide, for example.

When a specific rare earth oxide is employed for the inorganic oxide, it is possible to bring a thermal expansion coefficient of the support substrate 2 close to a thermal expansion coefficient of the solid electrolyte layer 4. The specific rare earth oxide is an oxide containing at least one rare earth element selected from a group including Y, Lu, Yb, Tm, Er, Ho, Dy, Gd, Sm, and Pr. Oxides of these rare earth elements are $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$, for example.

In the support substrate 2, when an electric conductive material is Ni and/or NiO and an inorganic oxide is a rare earth oxide, for example, a volume ratio between the electric conductive material and the inorganic oxide may satisfies "electric conductive material:inorganic oxide=35:65 to 65:35". When a volume ratio between an electric conductive material and an inorganic oxide is set to such a range, a well electric conductivity of the support substrate 2 is able to be kept and further to bring a thermal expansion coefficient of the support substrate 2 close to that of the solid electrolyte layer 4.

As illustrated in FIG. 1, the support substrate 2 is formed of hollow-plate-shaped, in other words, tubular-shaped. An exterior of the support substrate 2 is a plate-shaped body elongated in its standing direction, in other words, the length direction z, and has a pair of semicircular-shaped side surfaces m between the first flat surface n1 and the second flat surface n2.

The support substrate 2 made of ceramic is porous, and an open porosity thereof may be within a range equal to or more than 30%, particularly a range of 35% to 50%. The ceramic support substrate 2 has such an open porosity, so that it is possible to obtain a well gas permeability. An electric conductivity of the support substrate 2 may be equal to or more than 300 S/cm, particularly equal to or more than 440 S/cm.

The inter-connector 6 has electric conductivity, and further is dense. For a material of the inter-connector 6, for example, a lanthanum-chromite perovskite-type oxide ($LaCrO_3$-type oxide) or a lanthanum-strontium-titanium perovskite-type oxide ($LaSrTiO_3$-type oxide) may be employed. Each of the materials has electric conductivity, and further has a high stability. Each of the materials is not reduced even when being exposed to fuel gas (gas containing hydrogen and the like), and is not oxidized even when being exposed to gas containing oxygen (air and the like). When the inter-connector 6 is dense, fuel gas flowing through the gas flow paths 2a formed in the support substrate 2 and gas containing oxygen flowing through an outer side of the support substrate 2 hardly leak. The inter-connector 6 may have a relative density of equal to or more than 93%, particularly equal to or more than 95%.

The middle layer 21 is arranged between the solid electrolyte layer 4 and the air electrode 5. When a component of the solid electrolyte layer 4 and a component of the air electrode 5 react with each other, a reaction layer having a high electric resistance is formed, so that a power generation performance is reduced. When the middle layer 21 is arranged between the solid electrolyte layer 4 and the air electrode 5, a component of the solid electrolyte layer 4 and a component of the air electrode 5 hardly react with each other.

The middle layer 21 is a sintered body made of $CeO_2$ or $CeO_2$-type material containing a rare earth element other than Ce. The sintered body made of $CeO_2$ or $CeO_2$-type material containing a rare earth element other than Ce may be collectively referred to as a $CeO_2$-type sintered body. The $CeO_2$-type material may have a composition indicated by a composition formula of $(CeO_2)_{1-x}(REO_{1.5})_x$, for example. In the composition formula, RE is at least one selected from among Sm, Y, Yb, and Gd, and x is a number that satisfies 0<x≤0.3. For example, when a $CeO_2$ material or a $CeO_2$-type material is employed, for the middle layer 21, between the air electrode 5 made of a composite oxide in which Sr and La coexist and the solid electrolyte layer 4 made of stabilized zirconia, Sr in the air electrode 5 and Zr in the solid electrolyte layer 4 hardly react with each other.

When a $CeO_2$-type material containing Sm or Gd as RE is employed for a material of the middle layer 21, an electric resistance of the middle layer 21 is able to be reduced. For example, $CeO_2$ into which 10 mol % to 20 mol % of $SmO_{1.5}$ or $GdO_{1.5}$ is solid-dissolved may be employed for the $CeO_2$-type material containing Sm or Gd. Moreover, the middle layer 21 may have a two-layer structure.

The middle layer 21 according to the embodiments may be a $CeO_2$-type sintered body that further contains a small amount of Si. When the middle layer 21, in other words, a $CeO_2$-type sintered body contains a small amount of Si, pores are formed in the $CeO_2$-type sintered body. There presents possibility that the stress is accumulated between the solid electrolyte layer 4 and the air electrode 5 due to difference in a thermal expansion coefficient between the solid electrolyte layer 4 and the air electrode 5, and thus peeling of the air electrode 5 is generated, or the solid electrolyte layer 4 is damaged, and thus gas-leakage is generated. There is arranged the middle layer 21 having pores between the solid electrolyte layer 4 and the air electrode 5, and thus the stress generated between the solid electrolyte layer 4 and the air electrode 5 is reduced, peeling of the air electrode 5 and damage to the solid electrolyte layer 4 hardly occur, so that gas-leakage hardly occurs.

A content of Si in the middle layer 21 is equivalent to or less than 150 ppm (0.015% by mass) in terms of $SiO_2$. Hereinafter, a content of Si in the middle layer 21 in terms of $SiO_2$ may be simply referred to as a content of Si in the middle layer 21. When a content of Si in the middle layer 21 is equivalent to or less than 150 ppm in terms of $SiO_2$, an average porosity of a $CeO_2$-type sintered body is able to be set to equal to or less than 30%. When an average porosity of the $CeO_2$-type sintered body is equal to or less than 30%, open pores are hardly formed in the middle layer 21, so that gas-leakage hardly occurs. A content of Si in the middle layer 21 may be equal to or less than 130 ppm. When a content of Si in the middle layer 21 is equal to or less than 130 ppm, an average porosity of the $CeO_2$-type sintered body is able to be set to equal to or less than 24%, so that gas-leakage further hardly occurs. A content of Si in the middle layer 21 may be equal to or more than 10 ppm. When a content of Si in the middle layer 21 is equal to or more than 10 ppm, an average porosity of a $CeO_2$-type sintered body is able to be set to equal to or more than 5%, so that it is possible to ease the stress due to difference in a thermal expansion between the solid electrolyte layer 4 and the air electrode 5.

Figure 5:
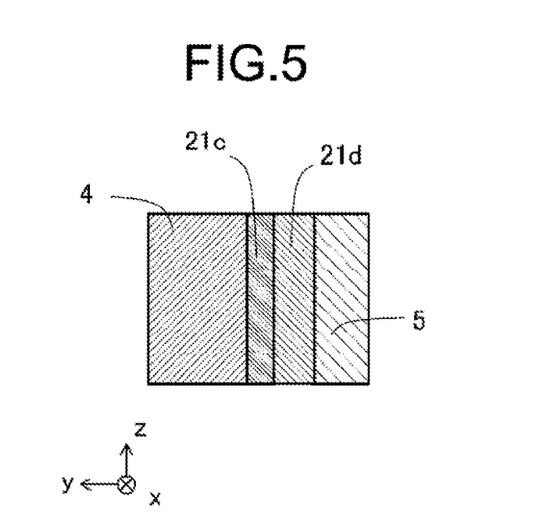
FIG. 5 is an enlarged cross-sectional view illustrating a part of FIG. 3.

As illustrated in FIG. 5, the middle layer 21 includes a first middle layer 21c that is in contact with the solid electrolyte layer 4, and a second middle layer 21d that is in contact with the air electrode 5. In other words, when the middle layer 21 is divided into two equal parts in the thickness direction y, a part that is in contact with the solid electrolyte layer 4 is the first middle layer 21c, and a part that is in contact with the air electrode 5 is the second middle layer 21d. In the cell 1, an average porosity of the first middle layer 21c may be smaller than an average porosity of the second middle layer 21d. In other words, the first middle layer 21c that is in contact with the solid electrolyte layer 4 may be dense, and the second middle layer 21d that is in contact with the air electrode 5 may be porous. When the first middle layer 21c is dense, the solid electrolyte layer 4 and the air electrode 5 hardly react with each other, and thus leakage of gas hardly occurs. When the second middle layer 21d is porous, the stress generated between the solid electrolyte layer 4 and the air electrode 5 is naturally eased.

A content of Si in the first middle layer 21c may be approximately equal to that of the second middle layer 21d. A content of Si in the second middle layer 21d may be larger than a content of Si in the first middle layer 21c. When a content of Si in the second middle layer 21d is larger than a content of Si in the first middle layer 21c, the first middle layer 21c tends to be dense, and the second middle layer 21d tends to be porous. When the second middle layer 21d is formed by using a pore forming material, the porosity of the second middle layer 21d is able to be larger than that of the first middle layer 21c.

In the middle layer 21, an average particle diameter of the $CeO_2$-type sintered body may be equal to or more than 0.1 μm and equal to or less than 0.5 μm, for example. In the $CeO_2$-type sintered body, an average particle diameter in the first middle layer 21c may be larger than an average particle diameter in the second middle layer 21d. When an average particle diameter of the first middle layer 21c is large, the porosity of the first middle layer 21c becomes smaller, and thus leakage of gas hardly occurs.

For example, when the middle layer 21 is cut off or peeled off from the cell 1 and elemental analysis, such as inductively coupled plasma (ICP) atomic emission spectrophotometry, is executed thereon, a content of Si in the middle layer 21 is able to be identified.

An average porosity of the middle layer 21 is able to be measured by the following method. A cross section along the thickness direction y of each layer in the cell 1 is polished, and a microstructure of the corresponding cross section of the middle layer 21 is observed by using a scanning electron microscope (SEM). In an image of the cross section of the middle layer 21 which is obtained by SEM, a part containing pores and a part not containing pores are determined and an imaging process is executed so as to calculate an area ratio of pores. The obtained area ratio of pores is defined as an average porosity of the middle layer 21. With respect to the first middle layer 21c, the second middle layer 21d, and other parts, the above-mentioned imaging process may be executed on a cross-sectional image of a corresponding part so as to calculate its average porosity. Note that an average porosity may be an average value of results obtained by executing the imaging process on a plurality of portions in the same part.

(Manufacturing Method of Cell)

One example of a fabricating method of the cell 1 will be explained. Note that the following various conditions such as material, particle diameter, temperature, and coating method may be appropriately changed. Moreover, a "molded body" indicates a state before firing.

First, a molded body of a support is fabricated. For example, powder of Ni and/or NiO, powder of a rare earth oxide such as $Y_2O_3$, an organic binder, and solvent are mixed to prepare a body paste. A molded body of a support is fabricated, by extrusion molding, from the prepared body paste, and the fabricated molded body is dried. As a molded body of a support, a calcined body may be used, which is obtained by calcining for 2 hours to 6 hours at 900° C. to 1000° C.

Next, slurry for a fuel electrode is prepared. For example, raw materials of $ZrO_2$ into which $Y_2O_3$ is solid-dissolved and NiO are weighed in accordance with a predetermined formulation composition and then mixed. Powder obtained by mixing the raw materials is mixed with an organic binder and solvent so as to prepare slurry for a fuel electrode. Hereinafter, $ZrO_2$ into which $Y_2O_3$ is solid-dissolved may be referred to as YSZ.

A molded body of a solid electrolyte layer is fabricated in accordance with the following manner. For example, toluene, binder powder, a commercially available dispersing agent, and the like are added to the powder of $ZrO_2$ into which $Y_2O_3$ is solid-dissolved so as to prepare slurry. An acrylic resin may be employed for the binder powder, for example. By using the obtained slurry, a sheet-like molded body of a solid electrolyte layer is formed by a method such as doctor blade.

The obtained sheet-like molded body of the solid electrolyte layer is coated with slurry for a fuel electrode, and then is dried. Thus, there is obtained a sheet-like laminated molded body in which a molded body of a fuel electrode is formed on a molded body of a solid electrolyte layer. A surface of the molded body of the fuel electrode in the above-mentioned sheet-like laminated molded body is overlapped with a molded body of a support so as to fabricate a first tubular laminated molded body. In this case, a surface of at least a part of the molded body of the support is arranged not to be covered with the sheet-like laminated molded body.

Next, a molded body of a middle layer is formed on a molded body of a solid electrolyte layer in the first tubular laminated molded body so as to fabricate a second tubular laminated molded body. A thermal treatment is executed, for 2 hours to 6 hours at 800° C. to 900° C., on powder of $CeO_2$ into which $GdO_{1.5}$ is solid-dissolved as raw material powder for a molded body of the middle layer, for example. Hereinafter, the powder of $CeO_2$ into which $GdO_{1.5}$ is solid-dissolved may be simply referred to as GDC powder. Toluene as solvent is added to the thermal-treated GDC powder to fabricate a slurry for the middle layer. A molded body of the solid electrolyte layer is coated with the obtained slurry for the middle layer so as to form a molded body of the middle layer.

A content of Si in the middle layer may be adjusted by the following method. For example, a content of Si in GDC powder is measured, and then fine powder of $SiO_2$ whose average particle diameter is equal to or less than 0.1 μm, for example, is added to the GDC powder and they are mixed with each other so as to obtain a desired content of Si. The GDC powder and the fine powder of $SiO_2$ may be wet-mixed with the use of toluene as solvent, for example. The porosity of a middle layer may be adjusted by using slurry for a middle layer containing pore forming material. For the pore forming material, for example, organic resin powder, carbon powder, or the like, which is able to be decomposed and removed by a thermal treatment, may be employed.

A surface of the second tubular laminated molded body, from which a molded body of a support is exposed, is coated with slurry for an inter-connector so as to form a molded body of an inter-connector layer, and thus a third tubular laminated molded body is fabricated. A material of an inter-connector layer such as oxide powder of $LaCrMgO_3$ is mixed with an organic binder and solvent so as to fabricate slurry for an inter-connector layer. A molded body of an inter-connector layer is arranged such that both end parts of a molded body in a solid electrolyte layer is overlapped with both end parts of a molded body for an inter-connector layer.

A de-binding treatment is executed on the obtained third tubular laminated molded body, and fired for 2 hours to 6 hours at a maximum temperature of 1400° C. to 1450° C. in an oxygen containing atmosphere so as to obtain a first sintered body in which a support, a solid electrolyte layer, a fuel electrode, a middle layer, and an inter-connector are integrated with each other.

A molded body for an air electrode is formed in the obtained first sintered body. For example, powder of $La_xSr_{1-x}Co_yFe_{1-y}O_3$ having a predetermined particle diameter, organic binder, pore forming material, and solvent are mixed with each other so as to fabricate slurry for an air electrode. A middle layer of the first sintered body is coated with the above-mentioned slurry by screen printing so as to form a molded body for an air electrode. Hereinafter, $La_xSr_{1-x}Co_yFe_{1-y}O_3$ may be simply referred to as LSCF.

The first sintered body in which a molded body for an air electrode is formed on a middle layer is fired for 1 hour to 3 hours at a maximum temperature of 1100° C. to 1200° C. so as to obtain a second sintered body. The obtained second sintered body is the cell 1 according to the embodiments having the structure illustrated in FIG. 1.

A reduction treatment may be executed on the support substrate 2 and the fuel electrode 3 while causing hydrogen gas to flow through the gas flow paths 2a of the obtained cell 1. For example, the reduction treatment may be executed for 5 hours to 20 hours at 750° C. to 1000° C.

(Cell Stack Device)

Figure 6:
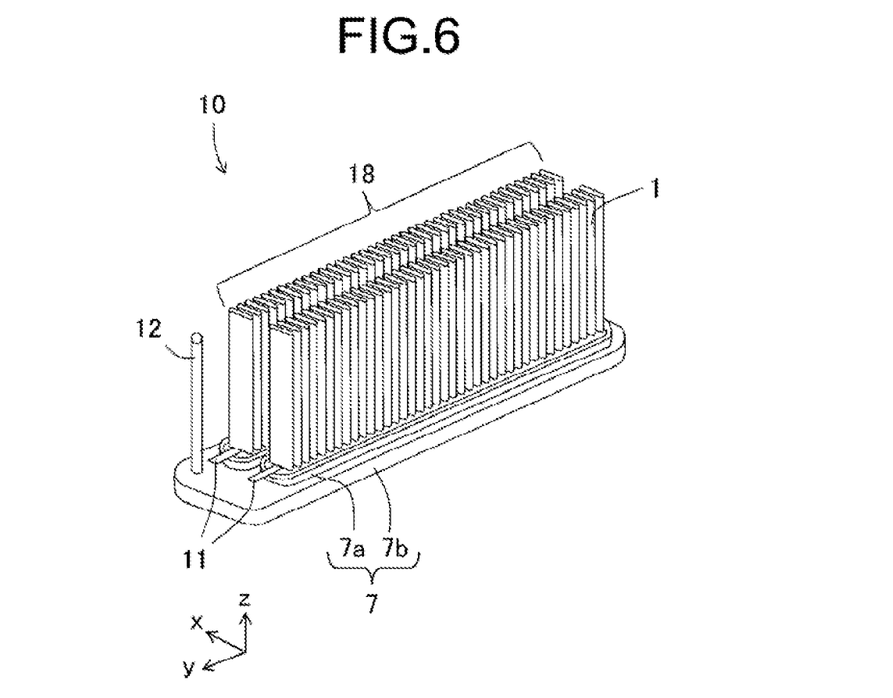
FIG. 6 is a perspective view illustrating one example of a cell stack device according to the embodiments.
Figure 7:
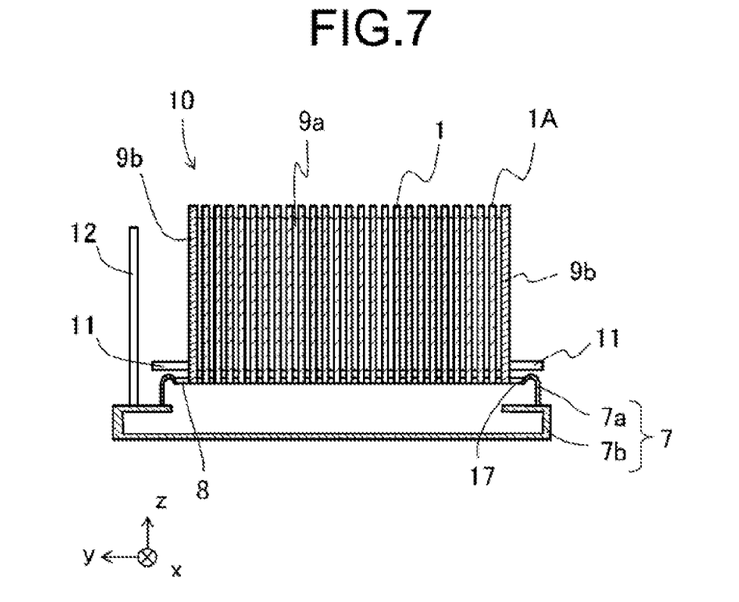
FIG. 7 is a cross-sectional view illustrating one example of the cell stack device according to the embodiments.
Figure 8:
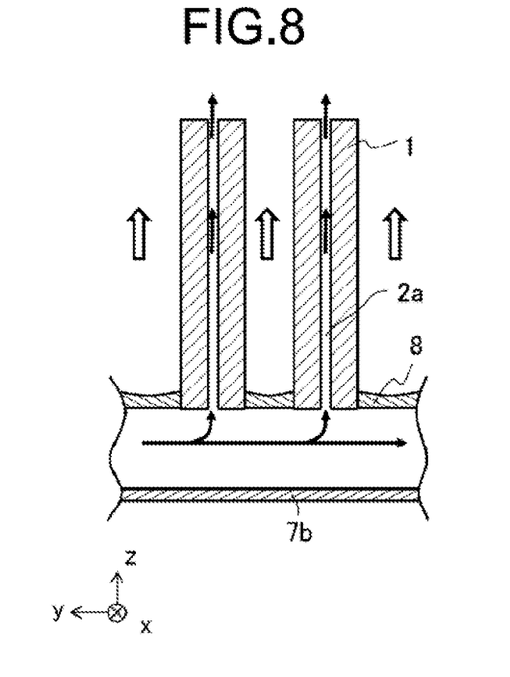
FIG. 8 is an enlarged cross-sectional view illustrating a part of FIG. 7.

FIG. 6 is a perspective view illustrating one example of a cell stack device for which the above-mentioned cell 1 is employed. FIG. 7 is a cross-sectional view illustrating one example of the cell stack device according to the embodiments, and FIG. 8 is an enlarged cross-sectional view illustrating a part of FIG. 7. A cell stack device 10 includes the plurality of aligned cells 1 and a manifold 7.

First end parts of the plurality of cells 1 are fixed to the manifold 7 by using sealing material 8. The manifold 7 supplies fuel gas to the plurality of cells 1.

In the example illustrated in FIGS. 6 to 8, the manifold 7 includes a support 7a and a gas tank 7b. Fuel gas is stored in an internal space of the manifold 7 which is formed by the support 7a and the gas tank 7b. A gas flow tube 12 is connected with the gas tank 7b. Fuel gas is supplied to the manifold 7 through the above-mentioned gas flow tube 12 to be supplied from the manifold 7 to the gas flow paths 2a that are formed in an inner part of the cell 1. Fuel gas led to the internal space of the manifold 7 is generated by a reformer 13 to be mentioned later.

Each of the plurality of cells 1 protrudes from the manifold 7 in the length direction z of the cell 1. The plurality of cells 1 is aligned in a stacked manner in the thickness direction y. One row of the plurality of aligned cells 1 may be referred to as a cell stack 18. The adjacent cells 1 are arranged such that the first flat surface n1 of the support substrate 2 of one of the adjacent cells 1 is opposite to the second flat surface n2 of the support substrate 2 of the other of the adjacent cells 1. A first end part in the length direction z of each of the cells 1 is individually fixed to the support 7*a* by the sealing material 8.

As illustrated in FIG. 7, in the thickness direction y, the cell 1 positioned on an outermost side of the cell stack 18 is electrically connected to an end-part electric-conductive member 9*b*. The end-part electric-conductive member 9*b* includes an electric-conductive tart 11 that protrudes toward an outer side of the cell stack 18. The electric-conductive part 11 executes current collection on electricity that is generated by power generation of the cell 1, and withdraws it to the outside.

In the manifold 7 illustrated in FIGS. 6 to 8, a lower end part of the support 7*a* is bonded to the gas tank 7*b*. The support 7*a* includes a single hole 17 that is communicated with an internal space of the gas tank 7*b*. Into the hole 17, first end parts of the plurality of cells 1 that is aligned in a row in the thickness direction y are inserted.

The cell stack device 10 illustrated in FIGS. 6 to 8 includes two rows of the cell stacks 18. Each of the two rows of the cell stack 18 is individually fixed to the support 7*a*. The gas tank 7*b* includes two through holes on its upper surface, and the support 7*a* is arranged at each of the two through holes. The support 7*a* is arranged such that the hole 17 fits to the through hole of the gas tank 7*b*. As described above, an internal space of the manifold 7 is formed by the one gas tank 7*b* and the two supports 7*a*.

The hole 17 of the support 7*a* is oval-shaped in a top view, for example. A length of the hole 17 in, for example, an alignment direction of the cells 1, in other words, a length in the thickness direction y is larger than a distance between the two end-part electric-conductive members 9*b* that are arranged at both ends of the cell stack 18. A width of the hole 17 is larger than a length of the cell 1 in the width direction x, for example.

As illustrated in FIG. 7, there present gaps between an inner wall of the hole 17 and an outer surface of the cell 1, and between the cells 1. As illustrated in FIG. 7, in a bonding part between an inner wall of the hole 17 and a first end part of the cell 1, the gap is filled with the solidified sealing material 8. Each of the first end parts of the plurality of cells 1 are bonded and fixed to an inner wall of the hole 17 by the sealing material 8. As illustrated in FIG. 8, the gas flow paths 2*a* are communicated with an internal space of the manifold 7 at the first end part of each of the cells 1.

As material of the sealing material 8, any of amorphous glass, crystallized glass, metal brazing material, or the like may be employed. As the crystallized glass among them, for example, $SiO_2$—$B_2O_3$ type, $SiO_2$—$CaO$ type, or $MgO$—$B_2O_3$ type may be employed.

The crystallized glass described in the present specification indicates crystallized glass whose ratio (crystallinity) of "volume occupied by crystal phase" with respect to whole volume of crystallized glass is equal to or more than 60% and ratio of "volume occupied by amorphous phase and impurities" with respect to whole volume of crystallized glass is less than 40%. Specifically, in order to obtain crystallinity of crystallized glass, "crystal phase is identified by using X-ray diffraction (XRD), and based on observation result of composition and composition distribution of crystallized glass using scanning electron microscope (SEM), energy dispersion X-ray spectroscopy (EDS) or electron probe micro analyzer (EPMA), and the like, volume ratio of crystal-phase region is calculated", for example.

As illustrated in FIG. 7, there is arranged an electric-conductive member 9*a* between the adjacent cells 1 of the cell stack 18. The electric-conductive member 9*a* electrically connects, in serial, the fuel electrode 3 of one of the two adjacent cells 1 and the air electrode 5 of the other cell 1. In FIGS. 6 and 8, illustration of the electric-conductive member 9*a* is omitted.

As described above, as illustrated in FIG. 8, when operating the cell stack device 10 of the fuel battery having been explained, fuel gas and gas containing oxygen having a high temperature of 600° C. to 800° C. is caused to flow therethrough, for example. The fuel gas may be, for example, gas containing hydrogen and the like, and the gas containing oxygen may be air, for example. As indicated by using solid-line arrows, fuel gas is led to an internal space of the manifold 7, and then is further led to each of the gas flow paths 2*a* of the plurality of cells 1 via the hole 17. Next, fuel gas having passed the gas flow paths 2*a* is ejected from second end parts that are free ends of the cells 1 toward the outside. As indicated by using hollow arrows, gas containing oxygen flows through gaps between the adjacent cells 1 in the length direction z of the cell 1.

Figure 9:
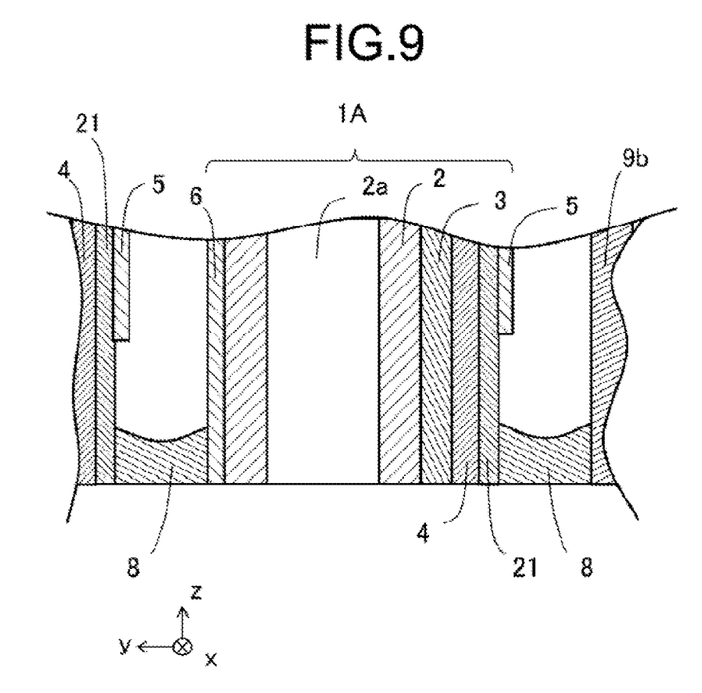
FIG. 9 is an enlarged cross-sectional view illustrating a bonding part between an inner wall of a hole and a first end part of the cell.

The cells 1 of the cell stack device 10 are bonded to the support 7*a* at their first end parts by the sealing material 8. As illustrated in FIG. 9, the sealing material 8 is directly in contact with the second part 21*b* of the middle layer 21 at the first end part. In the cell stack 18, one of the two cells 1 that are positioned at respective ends in the thickness direction y is referred to as a cell 1A. The second part 21*b* of the cell 1A is bonded to the end-part electric-conductive member 9*b* by the sealing material 8. The second part 21*b* of the cell 1 other than the cell 1A is bonded to the adjacent cell 1 by the sealing material 8.

The second part 21*b* of the cell 1A may be bonded to the manifold 7 by the sealing material 8. In this case, the end-part electric-conductive member 9*b* and the sealing material 8 may be in contact with each other, or the end-part electric-conductive member 9*b* and the sealing material 8 may be separated from each other, for example, the end-part electric-conductive member 9*b* may be in a state where a lower end part thereof is separated from a surface of the sealing material 8.

The porosity of the second part 21*b* may be larger than that of the first part 21*a*. The second part 21*b* may include open pores. The second part 21*b* is directly in contact with the sealing material 8, and thus the sealing material 8 easily penetrates into open pores of the second part 21*b*. When the sealing material 8 penetrates into open pores of the second part 21*b*, bonding force between the second part 21*b* and the sealing material 8 is increased. Furthermore, a gap hardly occurs between the second part 21*b* and the sealing material 8, and thus leakage of gas hardly occurs.

The cell stack device 10 is assembled in accordance with the following procedure, for example. First, there are prepared a predetermined number of the cells 1 and the support 7*a*. The predetermined number of the cells 1 are aligned and fixed in a stacked manner by using a predetermined jig and the like. A first end part of each of the aligned and fixed cells 1 are inserted at once into the hole 17 of the support 7*a*. Next, gaps between an inner wall of the hole 17 and the first end parts of the plurality of cells 1 and gaps between the first end parts of the adjacent cells 1 are filled with paste for the sealing material 8.

Next, a thermal treatment is executed on the filled paste for the sealing material 8. Caused by the thermal treatment, when a temperature of an amorphous material reaches up to its crystallization temperature, a crystal phase is generated in the amorphous material, so that crystallization of the amorphous material advances. As a result, caused by the sealing material 8 whose amorphous material is changed into crystallized glass, first end parts of the plurality of cells 1 are bonded and fixed to an inner wall of the hole 17. In other words, the first end parts of the cells 1 are individually bonded to the support 7a by the sealing material 8 and thus supported by the support 7a. After the cells 1 are individually bonded to the support 7a, the above-mentioned predetermined jig is removed from the plurality of cells 1.

The support 7a bonded to the plurality of cells 1 is further bonded to the gas tank 7b so as to obtain the cell stack device 10.

(Module)

Figure 10:
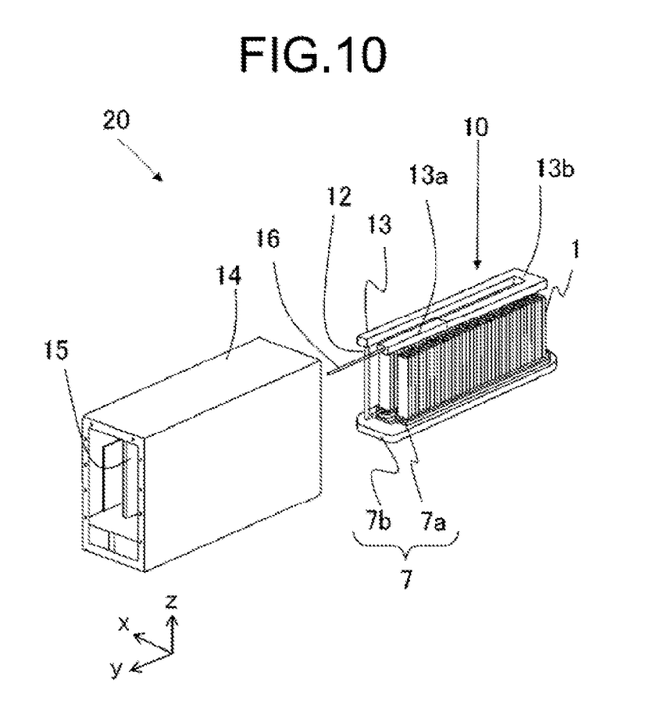
FIG. 10 is an exploded perspective view illustrating a module that includes one example of the cell stack device according to the embodiments.

FIG. 10 is an exploded perspective view illustrating one example of a module for which the above-mentioned cell stack device is employed. In FIG. 10, there is illustrated a module 20 in which the cell stack device 10 is housed in an inner part of a storage container 14. In FIG. 10, there is illustrated a state where covers of a front surface and a back surface of the storage container 14, which are parts of the storage container 14, are removed and the cell stack device 10 housed in an inner part of the storage container 14 is moved in the back direction. When the cell stack device 10 is slid into the storage container 14, the module 20 illustrated in FIG. 10 is capable of housing therein the cell stack device 10.

The module 20 illustrated in FIG. 10 includes the reformer 13 that is arranged on or above the cell stack device 10. The reformer 13 reforms raw fuel such as natural gas and kerosene, which is supplied via a raw-fuel supplying tube 16, so as to generate fuel gas. The reformer 13 may have a structure capable of steam reforming that is an efficient reforming reaction. The reformer 13 includes a vaporization unit 13a that vaporizes water and a reforming unit 13b in which a reforming catalyst (not illustrated) for reforming raw fuel into fuel gas is arranged, so as to perform steam reforming. Fuel gas generated by the reformer 13 is supplied to the manifold 7 via the gas flow tube 12, and then is further supplied, from the manifold 7, to the gas flow paths 2a arranged in the cells 1.

In the module 20 having the above-mentioned configuration, a temperature in the module 20 during normal power generation is 500° C. to 1000° C. in accordance with power generation of the cells 1 and firing of surplus fuel gas.

In the above-mentioned module 20, as described above, when employing the cell stack device 10 whose leakage of gas is little, it is possible to obtain the module 20 whose fuel efficiently is high.

(Module Housing Device)

Figure 11:
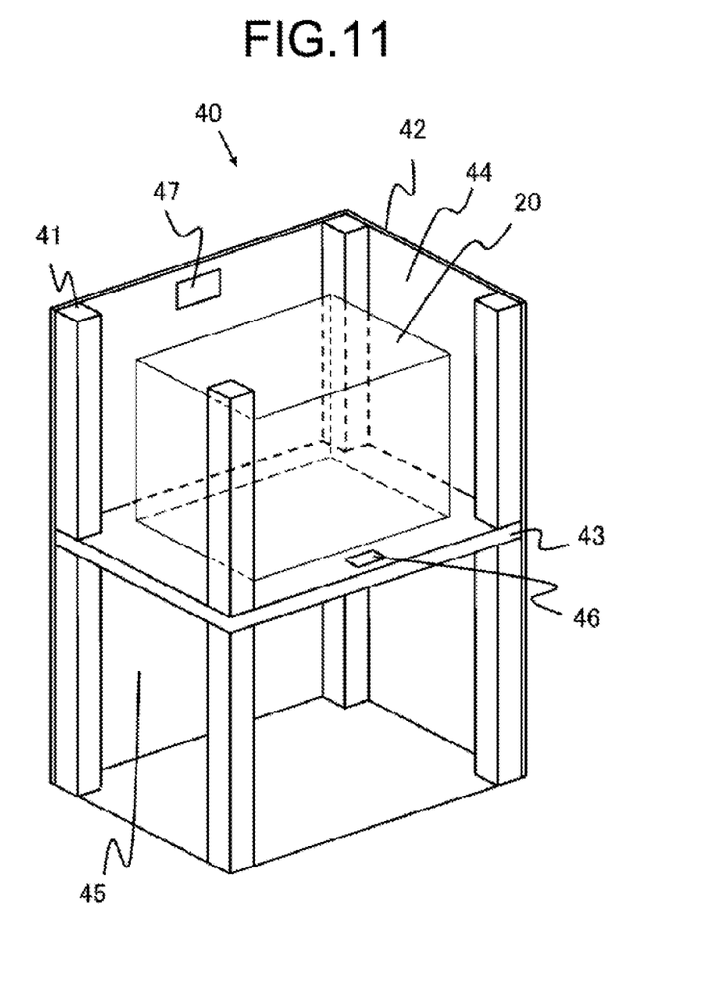
FIG. 11 is a perspective view schematically illustrating one example of a module housing device according to the embodiments.

FIG. 11 is a perspective view schematically illustrating one example of a module housing device. A module housing device 40 includes an external case, the module 20 illustrated in FIG. 10, and a not-illustrated auxiliary equipment. The auxiliary equipment drives the module 20. The module 20 and the auxiliary equipment are housed in the external case. Note that in FIG. 11, a part of the configuration is omitted.

The external case of the module housing device 40 illustrated in FIG. 11 includes pillars 41 and external plates 42. A partition plate 43 vertically divides an inner space of the external case. A space in the external case upper than the partition plate 43 is a module housing chamber 44 that houses therein the module 20, and a space in the external case lower than the partition plate 43 is an auxiliary-equipment housing chamber 45 that houses therein an auxiliary equipment for driving the module 20. Note that in FIG. 11, illustration of the auxiliary equipment housed in the auxiliary-equipment housing chamber 45 is omitted. The auxiliary equipment includes, for example, a water supplying device that supplies water to the module 20, a supply device that supplies fuel gas or air to the module 20, and the like.

The partition plate 43 includes an air vent port 46 for causing air in the auxiliary-equipment housing chamber 45 flow into the module housing chamber 44. The external plates 42 constituting the module housing chamber 44 includes an exhaust port 47 for exhausting air in the module housing chamber 44.

As described above, the above-mentioned module housing device 40 includes, in the module housing chamber 44, the module 20 having a high fuel efficiently, so as to have a high fuel efficiently.

As described above, the present disclosure is specifically explained; however, the present disclosure is not limited to the above-mentioned embodiments, and various substitutions and changes in the form of the embodiments described herein may be made without departing from the spirit of the disclosure.

In the embodiments, i.e. the "vertically-striped" cell 1 is employed in which the single element part a, constituted of the inner-side electrode (fuel electrode) 3, the solid electrolyte layer 4, and the outer-side electrode (air electrode) 5, is arranged on a surface of the support substrate 2; however, i.e. "horizontally-striped" cell may be employed in which the plurality of element parts a is arranged at a plurality of respective separated positions on the surface of the support substrate 2, and the adjacent element parts a are electrically connected to each other.

In the above-mentioned embodiments, an exterior of the support substrate 2 is plate-shaped; however, the support substrate 2 may be cylindrical-shaped. In this case, an inner space of the cylindrical support substrate 2 functions as the gas flow path 2a.

In the above-mentioned embodiments, there is indicated, i.e. the hollow-plate-shaped cell 1 in which the gas flow paths 2a are arranged in the plate-shaped support substrate 2; however, the cell may be, i.e. a plate-shaped cell, for example. It is sufficient that the cell according to the present disclosure includes the middle layer 21 between the solid electrolyte layer 4 and the air electrode 5, which is a $CeO_2$-type sintered body. A support substrate of the cell may be formed of metal having gas permeability and electric conductivity.

In the cell 1 according to the above-mentioned embodiments, the fuel electrode 3 and the air electrode 5 may be exchanged with each other, and the air electrode 5 may be arranged on a side of an inner-side electrode and the fuel electrode 3 may be arranged on a side of an outer-side electrode. In this case, flow of fuel gas and that of air according to the above-mentioned embodiments may be exchanged with each other.

Moreover, the cell 1 may include the support substrate 2 that serves as the fuel electrode 3, and the solid electrolyte layer 4 and the air electrode 5 that are sequentially laminated on a surface of the support substrate 2.

In the above-mentioned embodiments, as illustrated in FIG. 7, the support 7a is cylindrical-shaped; however, may be plate-shaped. In this case, the gas tank 7b may be bonded to a lower surface of the plate-shaped support 7a so as to form an internal space.

In the above-mentioned embodiments, as illustrated in FIG. 7, all of the first end parts of the cells 1 aligned in one row are inserted into the only one insertion hole 17, which is formed in the support 7a; however, the cells 1 may be inserted into the plurality of respective holes formed in the support 7a. In this case, the middle layers 21 of all of the cells 1 are bonded to the support 7a of the manifold 7. Furthermore, the two or more cells 1 may be inserted into each of the plurality of holes formed in the support 7a.

In the above-mentioned embodiments, the support 7a is separated from the gas tank 7b; however, the support 7a and the gas tank 7b may be integrated with each other as long as an internal space of the manifold 7 is communicated with the gas flow paths 2a of the plurality of cells 1.

In the above-mentioned embodiments, as illustrated in FIG. 6, there is exemplified the cell stack device 10 including the cell stacks 18 that are aligned in two rows; however, the cell stack device may include the cell stack 18 that is aligned in a single row.

Practical Example (Fabrication of Sample)

Samples of cell stack devices illustrated in FIG. 3 were fabricated. Each of the cell stack devices included 30 cells, and each of the cells were plate-shaped as illustrated in FIGS. 1 and 2. The cell had a length of 20 cm in its length direction, a length of 20 mm in its width direction, and a thickness of 2 mm.

The cell and the cell stack device were fabricated on the basis of the above-mentioned manufacturing method. Cells whose contents of Si in middle layers were different form each other were fabricated in the following manner. There were prepared Gd-doped $CeO_2$ (hereinafter, may be referred to as GDC) powder, Sm-doped $CeO_2$ (hereinafter, may be referred to as SDC) powder, and $CeO_2$ powder. After measuring contents of Si of the powders, a predetermined amount of $SiO_2$ spherical fine powder whose average particle diameter is 0.05 μm was added to each of the powders so as to be mixed, and then they were wet-mixed by using toluene as solvent.

(Measurement of Content of Si)

A middle layer was cut off from the fabricated cell, and a content of Si in the middle layer was measured by ICP emission spectrophotometry. Contents of Si in middle layers of the cells are indicated in Table 1. Note that a content of Si in a middle layer of Sample No. 1 was less than a lower measurement limit.

(Measurement of Porosity)

As described above, in order to obtain an average porosity of a middle layer of the fabricated cell, a "resin embedding" treatment was executed on a cell, mechanical polishing was executed on the cell, and observation of microstructure of its cross section was executed by using a scanning electron microscope so as to calculate an area ratio of pores in a middle layer. Result is indicated in Table 1.

(Presence/Absence of Peeling of Air Electrode)

Presence/absence of peeling of an air electrode in the fabricated cell was identified. For each sample, 10 cells were aligned such that an air electrode and an inter-connector of adjacent cells were facing each other, and the air electrode and the inter-connector of the adjacent cells were glued to each other by using adhesive agent. There was executed a peeling test for peeling the glued 10 cells one by one from an inter-connector side. When adhesive agent remained in cells on both sides, in other words, in a case of peeling due to breakage of the adhesive agent, the case was determined that peeling of an air electrode was absent, and a case where adhesive agent remained on an inter-connector side alone was determined that peeling of an air electrode was present. Result is indicated in Table 1.

A cell stack device was fabricated by using each kind of cells. The used cells were plate-shaped as illustrated in FIGS. 1 and 2. The cell stack device was manufactured by the above-mentioned manufacturing method. The cell had a length of 20 cm in its length direction, a length of 20 mm in its width direction, and a thickness of 2 mm.

A support having a single oval-shaped hole alone, namely, the support illustrated in FIGS. 6 and 7 was employed for a support. $SiO_2$—MgO—$B_2O_5$—$Al_2O_3$ glass was employed for sealing material. Stainless steel was employed for a material of a manifold composed of the support and the gas tank.

(Measurement of Fuel Utilization Factor)

Relation between a fuel utilization factor and a voltage was recognized with respect to each of the above mentioned samples. At 700° C. and 0.3 A/cm², a ratio of a voltage under a condition at which 90% of charged fuel was used (Uf90) with respect to a voltage under a condition at which 80% of charged fuel was used (Uf80) was defined as Uf90/80, and when Uf90/80 is small, power generation efficiently was low due to leakage of fuel gas.

TABLE 1

| Sample No. | Material | Middle Layer Content of Si ppm | Middle Layer Average Porosity % | First Middle Layer Average Porosity % | Second Middle Layer Average Porosity % | Result Peeling of Air Electrode Presence/Absence | Uf90/80 % |
|---|---|---|---|---|---|---|---|
| 1 | GDC | — | 2 | 2 | 2 | Present | — |
| 2 | GDC | 10 | 6 | 4 | 7 | Absent | 97.5 |
| 4 | GDC | 50 | 9 | 8 | 11 | Absent | 96.5 |
| 5 | GDC | 100 | 17 | 15 | 19 | Absent | 95.4 |
| 6 | GDC | 130 | 24 | 21 | 27 | Absent | 92.8 |
| 7 | GDC | 150 | 30 | 27 | 33 | Absent | 91.9 |
| 8 | GDC | 200 | 36 | 33 | 40 | Absent | 89.0 |
| 9 | GDC | 230 | 40 | 37 | 44 | Absent | 82.7 |
| 10 | SDC | 10 | 7 | 4 | 10 | Absent | 98.3 |
| 11 | SDC | 100 | 18 | 16 | 20 | Absent | 94.7 |
| 12 | $CeO_2$ | 10 | 5 | 3 | 7 | Absent | 99.3 |
| 13 | $CeO_2$ | 100 | 17 | 15 | 20 | Absent | 93.7 |

A middle layer of each of Samples No. 2 to 7 and 10 to 11 contained Si, the content of Si equivalent to or less than 150 ppm in terms of $SiO_2$, and thus peeling of an air electrode did not occur. Uf90/80 of each of Sample No. 2 to 7 and 10 to 11 was larger than 90%, and thus leakage amount of fuel gas was considered to be small. A content of Si in a middle layer of Sample No. 1 was equal to or less than detection limit of elemental analysis, the porosity of the middle layer was small, and an air electrode was peeled off from a cell in the peeling test. A fuel utilization factor of Sample No. 1 was not measured. A content of Si in a middle layer of each of Samples No. 8 and 9 was larger than 150 ppm, peeling of an air electrode did not occur; however, Uf90/80 was small, and thus leakage amount of fuel gas was considered to be large.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A cell comprising:
    a solid electrolyte layer including a first surface and a second surface opposite to the first surface;
    a fuel electrode on the first surface;
    an air electrode on the second surface; and
    a middle layer between the second surface and the air electrode, wherein
    the middle layer is a CeO2-type sintered body containing Si, the content of Si equivalent to or less than 150 ppm in terms of SiO2,
    wherein the middle layer includes:
        a first middle layer that is in contact with the solid electrolyte layer; and
        a second middle layer that is in contact with the air electrode, and
        a content of Si in the second middle layer is larger than a content of Si in the first middle layer.

2. The cell according to claim 1, wherein the middle layer includes:
    an average porosity of the first middle layer is smaller than an average porosity of the second middle layer.

3. A cell stack device comprising:
    a cell stack in which a plurality of cells according to claim 1 is aligned.

4. A module comprising:
    a storage container; and
    the cell stack device according to claim 3 that is housed in the storage container.

5. A module housing device comprising:
    an external case;
    the module according to claim 4 and an auxiliary equipment that drives the module, which are housed in the external case.

6. The cell according to claim 1, wherein the content of Si in the second middle layer is equal to or more than 50 ppm.

7. The cell according to claim 1, wherein the content of Si in the second middle layer is equal to or less than 150 ppm.

8. The cell according to claim 1, wherein the content of Si in the second middle layer is equal to or more than 50 ppm and equal to or less than 150 ppm.

* * * * *